Aug. 18, 1925.

J. S. SHEAFE 1,550,107

TRAIN PIPE COUPLING

Filed Feb. 3, 1922

James S. Sheafe
INVENTOR.

BY
ATTORNEY.

Patented Aug. 18, 1925.

1,550,107

UNITED STATES PATENT OFFICE.

JAMES S. SHEAFE, OF EVANSTON, ILLINOIS.

TRAIN-PIPE COUPLING.

Application filed February 3, 1922. Serial No. 533,856.

*To all whom it may concern:*

Be it known that I, JAMES S. SHEAFE, a citizen of the United States, residing at Evanston, in the county of Cook and State of Illinois, have invented a certain new and useful Improvement in Train-Pipe Couplings, of which the following is a full, clear, and exact description, reference being had to the accompanying drawings.

This invention relates generally to a coupling-head and more particularly to a coupling-head having a non-corrodible gasket-seat or bushing fitted therein as set forth in my Patent No. 922,347 of May 18, 1909, and the present application is a continuation in part of my application Serial No. 319,316, filed August 23, 1919.

The objects of the present invention are the provision of means for retaining an inset gasket-seat or bushing in the train-pipe coupling of an air-brake hose, and to so construct the retaining means that it may be readily peened, headed, or rolled over a portion of the seat or bushing to hold the same firmly against displacement; the provision of a coupling that can be more easily and cheaply made than other couplings and that will last longer when in use; while further objects and advantages of the invention will appear as the description proceeds. Certain embodiments of my invention are shown in the accompanying drawings which are meant to be illustrative only and in no wise to limit my invention except as it shall be defined by the accompanying claim.

Figure 1:
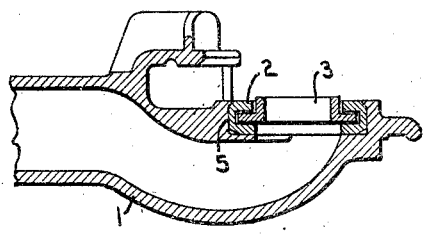
Figure 2:
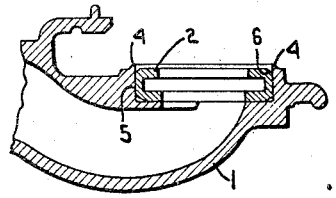
Figure 3:
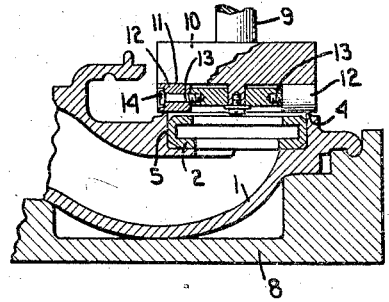
Figure 5:
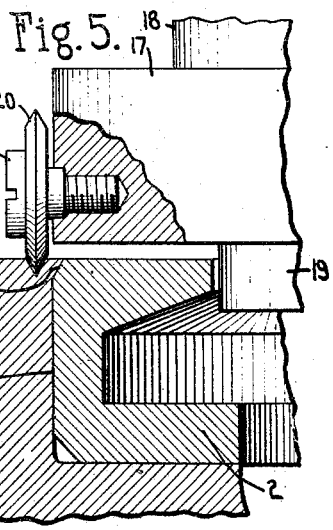
Figure 4:
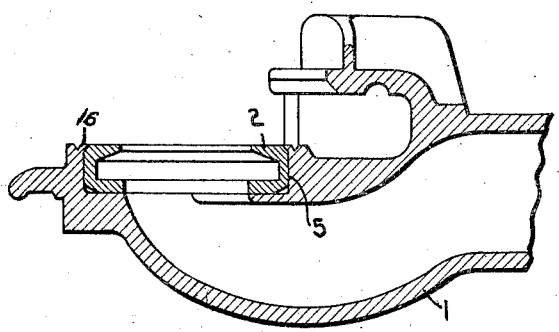
Figure 6:
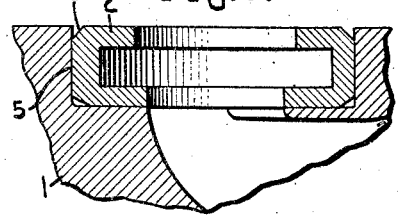

In the drawings, Fig. 1 is a longitudinal sectional view of one form of my device, showing the bushing clamped in the coupling; Fig. 2 is an enlarged detail view showing the bushing in place and a thin rib of metal on the coupling ready to be rolled or peened over the edge of the bushing to hold the same in place; Fig. 3 illustrates the method of rolling the metal over the edge of the bushing; Fig. 4 is a longitudinal sectional view of another form of my invention showing a bushing clamped in a coupling; Fig. 5 is an enlarged detail view showing the manner in which the bushing is clamped therein; and Fig. 6 shows the appearance of the parts illustrated in Fig. 4, prior to their attachment together.

Describing the drawings by reference numerals, 1 designates a coupling of the type ordinarily used for air brake and signal hose, and 2 designates a non-corrodible seat or bushing for the gasket 3. I have found by experience that if these seats are secured by a simple pressed joint they become loose in course of time owing to the unequal thermal expansion of the different metals used. Consequently I have devised a simple means for overcoming this difficulty which means securely holds the seat in the coupling thereby preventing looseness between said parts and subsequent loss of the seat or leakage of air past the same.

I preferably accomplish this result by casting the coupling body with a narrow ridge or rib 4 about the edge of the socket 5 formed therein to receive the bushing 2, and chamfering or rabbeting the edge of the seat as at 6. The ridge may be very small and is best made triangular in cross section as shown and preferably has one of its surfaces forming a continuation of the side wall of the socket 5, although I do not restrict myself thereto. The coupling body being made of malleable metal it is an easy matter to roll or peen the soft metal of the ring or ridge 3 down over the space formed by the bushing, the chamfered edge of the bushing receiving the surplus metal, thereby making a snug, neat fit without grooves to weaken the construction about the bushing or catch sand and water.

This may obviously be effected by hammering but the simplest and most rapid mode I have found is to support the coupling in a jig 8 on the bed of a drill press or similar machine and bear down on the coupling with a tool such as shown in Fig. 3, wherein 9 is a shank having a flat circular flange 10 providing a downwardly facing shoulder 11 beneath which are a plurality of equally spaced rollers 12, 12, loosely sleeved on radial arms 13. These arms are provided with heads 14 which force the rollers to travel in a circle, but the pressure is exerted solely by the flange. This rolls the face of the coupling absolutely flat and makes a joint which prevents leakage of air or loss of the bushing.

However it is not necessary to cast the bushing with a rib 4, because by using a grooving roller the metal can be bent laterally as shown at 16 in Figs. 4 and 5. The face of the coupling body is formed with a recess 5 as before and the bushing is sloped as at 6. The tool preferably consists of a head 17 having a shank 18 and pilot 19, the head having one or more sharp edged disks 20 journaled thereto on radial gudgeons as 21. The same operation can be performed with a hammer and chisel or by a punch press having a circular chisel, although I prefer the rolling operation. I also prefer to make the socket or recess substantially cylindrical although a certain degree of taper is permissible.

The bushing is held with absolute firmness, the coupling lasts several times as long in practice as previous devices, and can be made more cheaply than any plain iron coupling owing to the fact that the gasket seat can be cut in the bushing much more cheaply than in the iron. I prefer to make the bushing of brass, but it can be made as a forging or die-casting.

I do not limit myself to any of the shapes, tools, or manipulations herein described; I do not limit myself to side-ported couplings nor to air-hose couplings; I do not limit myself to bushings of non-corrodible metal; and in general I do not limit myself in any wise except as set forth in my claim.

Having thus described my invention, what I claim is:

A blank for a hose coupling comprising a malleable metal head having a mating face whose plane is parallel to the axis of the head, said head having a longitudinal bore therethrough and a lateral port opening through the center of said face, complementary flanges carried by said head on opposite sides of said port and concentric therewith, said flanges projecting approximately parallel with the longitudinal axis of the coupling and adapted to engage the flanges of a companion head, said port being formed at its mouth with a cylindrical walled counterbore and said face being formed immediately adjacent said counterbore with an integral annular rib which projects beyond the remainder of said face.

In testimony whereof, I hereunto affix my signature.

JAMES S. SHEAFE.